United States Patent [19]

Barry et al.

[11] 4,291,107

[45] Sep. 22, 1981

[54] GLASS SEALS FOR SEALING BETA-ALUMINA IN ELECTRO-CHEMICAL CELLS OR OTHER ENERGY CONVERSION DEVICES, GLASSES FOR USE IN SUCH SEALS AND CELLS OR OTHER ENERGY CONVERSION DEVICES WITH SUCH SEALS

[75] Inventors: Thomas I. Barry, Hampton Hill; Gary S. Schajer, London; Francis M. Stackpool, Frodsham, all of England

[73] Assignee: Chloride Silent Power Limited, London, England

[21] Appl. No.: 140,633

[22] Filed: Apr. 15, 1980

[30] Foreign Application Priority Data

Apr. 19, 1979 [GB] United Kingdom ............... 13668/79

[51] Int. Cl.³ .......................................... H01M 10/39
[52] U.S. Cl. ................................... 429/104; 429/185; 106/47 R; 106/54; 501/15; 501/77; 501/52
[58] Field of Search .................... 429/104, 174, 185; 106/52, 47 R, 54, 73.4

[56] References Cited

U.S. PATENT DOCUMENTS

| | | | |
|---|---|---|---|
| 3,563,772 | 2/1971 | Jocobus et al. | 106/52 |
| 3,598,620 | 8/1971 | Akhtar | 106/54 |
| 3,960,596 | 6/1976 | Mitoff et al. | 429/185 |
| 4,132,820 | 1/1979 | Mitoff | 429/185 |

*Primary Examiner*—Donald L. Walton
*Attorney, Agent, or Firm*—Beveridge, DeGrandi & Kline

[57] ABSTRACT

A glass for sealing a beta-alumina tube in a sodium-sulphur cell has a composition suitable to resist attack by sodium at elevated temperatures and a coefficient of thermal expansion suitable for use with beta-alumina. The glass consists essentially of 28–48 mol % $B_2O_3$, 0–20 mol % $SiO_2$, 16–28 mol % $Al_2O_3$, together with 18–33 mol % of at least one alkaline earth oxide selected from the group consisting of BaO, SrO, CaO and MgO, the proportions of the constituents being such that the combined total of $B_2O_3$ and $SiO_2$ is 40 to 60 mol % and furthermore being such that $0.0517 A_1 + 0.0354 A_2 - 0.0063 A_3 + 0.168 A_4 + 0.1336 A_5 + 0.098 A_6 + 0.1597 A_7$, lies between 5.7 and 6.4 where $A_1$, $A_2$, $A_3$, $A_4$, $A_5$, $A_6$ and $A_7$ are the respective molar percentages of $B_2O_3$, $SiO_2$, $Al_2O_3$, BaO, CaO, MgO and SrO. A cell sealed with such a glass is described.

20 Claims, 8 Drawing Figures

THERMAL STRAIN CURVES OF SEAL MATERIALS.

SEAL STRESS CHARACTERISTIC.

VARIATION IN SEAL STRESSES FOR GLASSES WITH THE SAME CROSSOVER TEMPERATURE.

GLASS SEALS FOR SEALING BETA-ALUMINA IN ELECTRO-CHEMICAL CELLS OR OTHER ENERGY CONVERSION DEVICES, GLASSES FOR USE IN SUCH SEALS AND CELLS OR OTHER ENERGY CONVERSION DEVICES WITH SUCH SEALS

BACKGROUND OF THE INVENTION

1. Field of the Invention

This invention relates to glass seals for beta-alumina in electro-chemical cells and other energy conversion devices containing sodium and to glasses for use in such seals.

2. Prior Art

In cells, such as for example sodium-sulphur cells, and other devices (e.g. sodium-sodium thermo-electric generators) where beta-alumina ceramic is used as a solid electrolyte through which sodium ions can pass, it is necessary to seal the beta-alumina in the cell structure. Sodium sulphur cells utilise a molten alkali metal and have to operate at elevated temperatures where the electrode materials are liquid. Seals necessary to seal these electrode materials within the cells have therefore not only to withstand highly reactive materials at these elevated temperatures but are also subjected to temperature cycling. As a typical example, a sodium sulphur cell might contain a beta-alumina electrolyte tube closed at one end and having sodium on one face of the tube, preferably the outer face, and the sulphur/polysulphides on the other face. The cell has to be sealed to prevent escape or mixing of these materials and a number of proposals have been made for the sealing of such cells. Compared with most metals, ceramic materials are generally weak, particularly in tensile strength and it is necessary therefore in any seal for such a cell to ensure that the ceramic material is not overstressed.

It is well-known in a sodium sulphur cell to provide a beta-alumina electrolyte tube with an alpha-alumina tubular extension at its open end so that the end portion is ionically insulative. The alpha-alumina and beta-alumina have similar coefficients of thermal expansion and the alpha-alumina extension can be secured to the beta-alumina with a glass seal.

The present invention is concerned more particularly with such glass seals. The use of glass seals is described, for example in U.S. Pat. Nos. 3,928,071, 3,826,685 and 3,868,273. These references however do not discuss the glass composition. It is convenient, in sodium sulphur cells and similar electro-chemical cells to use a glass as a bonding agent between ceramic materials or between a ceramic material and a metal member. In a sodium sulphur cell, the closure may be effected by sealing the ceramic electrolyte material to a closure member or to the housing. This may readily be done with a glass seal. The alpha-alumina extension then has to be sealed to the housing or to the closure member. The closure member may be a part of a current collector. Thus glass may be employed, in sealing a cell, as a bond between solid electrolyte material, e.g. beta-alumina ceramic, or an insulating ceramic, e.g. alpha-alumina, and a metal component or components such as a current collector, an intermediate component, or an external housing. The glass-to-metal bond is formed by a reaction between the glass and an oxide layer on the metal.

Both for sealing alumina to metal and for sealing beta-alumina to alpha-alumina, the glass employed must be a sodium-resistant glass. The metal material has to be chosen in accordance with both mechanical and chemical requirements. In particular, it must resist attack by sodium at elevated temperatures. It is the practice in sodium sulphur cells to use mild steel or stainless steel for the housing, in contact with the sodium.

In particular, use has heretofore been made of a glass, commonly known as BAB glass. As is described in U.S. Pat. No. 3,275,358, this glass, which has a composition by weight of about 40% $B_2O_3$, 25% $Al_2O_3$ and 35% BaO can be used for providing a fused hermetic seal around lead wires of tantalum and other similar metals. Expressed in molar percentages, the composition of this glass is about 54.8% $B_2O_3$, 23.4% $Al_2O_3$ and 21.8% BaO.

This BAB glass however does not fully meet the difficult service conditions of seals for sodium-sulphur cells, particularly alpha to beta alumina seals, which place a severe demand on the performance of the sealing glass used. The required characteristics of such a glass in terms of its physical and chemical properties are many and sometimes conflicting and so the development of a glass composition approaching the desired behaviour is of necessity a complex process. It must produce a reliable hermetic seal and hence must wet both the alpha and beta alumina. The glass should be chemically compatible with cell materials at cell operating temperatures. The thermal expansion characteristics of the glass and the other seal components must be compatible to give low seal stresses over the whole working temperature range and lifetime of the cell.

In general, most stable glasses will satisfactorily wet both alpha and beta alumina and so could potentially satisfy the first criterion. The requirement as the chemical compatability considerably constrains the choice of glasses to the use of the alumino-borate glasses because of their known good sodium resistance. The requirements about thermal expansion characteristics are not satisfactorily met by BAB Glass.

It is necessary to consider in further detail the problems of seal stresses. The theory and practice of glassed seals, notably glass-to-metal seals, is very well established: See, for example, "Glass-to-Metal Seals" by J. H. Partridge, Soc. for Glass Technology, Sheffield 1949 and "Glass-to-metal Seals" by A. W. Hull and E. E. Burger, Physics 5. 384–405 1934. One of the most important factors contributing to successful seal performance is the close thermal matching of the seal components. Differential thermal strain causes seal stresses which, if sufficiently high, can result in seal failure.

At high temperatures when a seal is made, the glass is fluid and wets the ceramic components. On cooling, the viscosity of the glass rapidly increases and eventually it becomes so high that the glass behaves as a rigid material. It is convenient for analysis to idealise the transition between the fluid and rigid regions as occurring suddenly at a single temperature called the set point, even though in reality the change takes place over a small range of temperatures. Above the set point any thermal stresses developed in the glass are relieved by viscous flow. However, at the set point the glass becomes rigid and mechanically constrains the seal components, so that on further cooling, stresses are developed due to the subsequent differences in thermal strain characteristics.

A convenient graphical construction to assess the magnitude of the differential strain is shown in FIG. 1 of the accompanying drawings where the expansion/contraction characteristics (dimension change plotted as ordinate against temperature as abscissa) of the seal components are plotted and the characteristics are vertically displaced so as to intersect the set point. Assuming that the seal components are elastic, the stresses generated at any temperature are proportional to the vertical separations of the two curves in FIG. 1, and so the stress-temperature characteristic has the shape shown in FIG. 2, in which the stress is plotted as ordinate against temperature as abscissa.

For sodium-sulphur cells, the properties of the ceramics to be joined are effectively fixed. The main seal stresses in the glass are material dependent only and are not greatly influenced by seal geometry except at points close to the seal edges. The composition of the sealing glass does however have an important effect on the seal stress characteristics.

Because of its brittle nature, glass has a much higher strength in compression than in tension. Thus, for good seal strength, a high crossover temperature (see FIGS. 1 and 2) is desirable so that the seal stresses are compressive both at room temperature and operating temperature (typically 300°-400° C.). This is not the only criterion for satisfactory seal stresses because seal cracking and failure can also occur if the room temperature stress is too highly compressive.

All glasses have non-linear thermal strain characteristics and these are such that a sealing glass will always be in tension at high temperatures. By using a glass with a high set point, it is possible to have both a high crossover temperature and a moderate room temperature compressive stress as is shown in FIG. 3, which is a diagram similar to FIG. 2 but for two further different glasses.

Seals made with BAB glass have a generally tensile seal stress characteristic and tend to crack easily in thermal cycling of sodium sulphur cells. An additional disadvantage of this glass is a high densification rate. Densification, sometimes called stabilisation, is a process of molecular reordering of a glass at temperatures below the glass transition point, resulting in a gradual shrinkage of the material. When constrained within the seal components, the sealing glass is thereby subjected to increasing tensile stresses, which can cause seal failure if they grow sufficiently large. It might appear that improvement could be obtained by altering the relative proportions of the three constituents in this glass. However, as will be apparent from consideration of the data given by C. Hiramaya, J. Amer. Ceram. Soc. 1961, 44(12), 602-6 on this ternary system that the particular composition or BAB glass is on the edge of the glass forming region of the phase diagram of this three-phase system and it has not been found possible to satisfactorily lower the expansion coefficient of the glass of this ternary system by altering the proportions of the components.

SUMMARY OF THE INVENTION

According to the present invention, a glass for sealing to beta-alumina in an electro-chemical cell or other energy conversion device containing sodium, consists essentially of:
(a) 40-60 mol % glass former consisting of 28-48 mol % $B_2O_3$ and 0-20 mol % $SiO_2$
(b) 16-28 mol % $Al_2O_3$
(c) 18-33 mol % of at least one alkaline earth oxide selected from the group consisting of BaO, CaO, MgO and SrO, where the proportions of the constituents furthermore are such that:

$$0.0517A_1 + 0.0354A_2 - 0.0063A_3 + 0.168A_4 + 0.1336A_5 + 0.098A_6 + 0.1597A_7$$

lies between 5.7 and 6.4, where $A_1$, $A_2$, $A_3$, $A_4$, $A_5$, $A_6$ and $A_7$ are the respective molar percentages of $B_2O_3$, $SiO_2$, $Al_2O_3$, BaO, CaO, MgO and SrO.

The coefficients of $A_1$, $A_2$ etc. quoted above are, as will be explained later, truncated values of regression coefficients relating to effect of the constituent proportions on the mean linear coefficient of thermal expansion.

The proportion of $Al_2O_3$ would usually be between 17 and 28 mol %.

The glass may contain one or more of the alkaline earth oxides; preferably the proportions of these oxides lie in the ranges 0-25 mol % BaO, 0-15 mol % SrO, 0-30 mol % CaO and 0-20 mol % MgO with a minimum total of 18 and a maximum total of 33 mol %.

It will be appreciated by those skilled in the art that some of the compositions defined above lie close to the boundary of the glass-forming region. These boundaries, such as those discussed with reference to alkali alumina borate glass systems by Hiramaya in the above-mentioned reference, are diffuse. Care has to be taken in the use of compositions in the boundary region because of the possibility of devitrification.

The invention furthermore includes within its scope a hermetic seal between ana lpha-alumina components and a beta-alumina component in a sodium sulphur cell comprising a glass body fused between surfaces of these components, the glass consisting essentially of 28-48 mol % $B_2O_3$, 0-20 mol % $SiO_2$, 16-28 mol % $Al_2O_3$, together with 18-33 mol % of at least one alkaline earth oxide selected from the group consisting of BaO, SrO, CaO and MgO, the proportions of the constituents being such that the combined total of $B_2O_3$ and $SiO_2$ is 40 to 60 mol % and furthermore being such that 0.0517 $A_1$+0.0354 $A_2$−0.0063 $A_3$+0.168 $A_4$+0.1336 $A_5$+0.098 $A_6$+0.1597 $A_7$, lies between 5.7 and 6.4 where $A_1$, $A_2$, $A_3$, $A_4$, $A_5$, $A_6$ and $A_7$ are the respective molar percentages of $B_2O_3$, $SiO_2$, $Al_2O_3$, BaO, CaO, MgO and SrO.

The glass composition described above may employ silica to reduce the thermal expansion coefficient compared with that of a pure BAB glass and to improve its glass forming properties.

Additions of other alkaline earth oxides CaO, MgO and SrO within the prescribed range result in a glass having suitable seal stresses for operations in sodium/sulphur glassed seals and superior densification properties compared with a three component BAB glass.

For the range of compositions described above, various glass properties can be expressed as a linear algebraic summation of the kind.

$$a = \sum_{i=1}^{n} a_i A_i$$

where
a is the property in question.
$A_i$ is the linear coefficient for compound i.

$a_i$ is the molar percentage of the compound i.

Implied in this relationship is the assumption that the contribution of each component to the overall glass behaviour is linear and independent of the amount and kind of other components present. This is unlikely to be generally true but, from experimental results this assumption appears to be acceptable over the composition range of interest.

The expression $0.0517 A_1 + 0.0354 A_2 - 0.0063 A_3 + 0.168 A_4 + 0.1336 A_5 + 0.098 A_6 + 0.1597 A_7$ when multiplied by $10^{-6}$ gives the value of the mean linear coefficient of expansion between 25° and 500° C. ($\alpha_{25}^{500}$) and thus the above-defined glass would have a coefficient between 5.7 and $6.4 \times 10^{-6}/°C$. Using this expression, the possible glass compositions for any required coefficient of expansion can be determined and it is thus possible to determine the composition in accordance with a specific physical requirement, e.g. to match a measured coefficient of expansion of the beta-alumina.

A number of physical properties of glass compositions as defined above may be expressed in a similar way as a series of coefficients representing the molar effects of the various constituents which can be summed in a similar way to obtain the magnitude of a required parameter.

DESCRIPTION OF THE PREFERRED EMBODIMENT

A number of glass compositions within the present invention are set out in Table 1. This tables also includes, for comparison purposes, a BAB glass constituting example 597. For convenience, the thirtyone glasses in the table have been given, in the left-hand column, the Case Nos. 1–31. Example 597 is Case No. 1.

Figure 1:
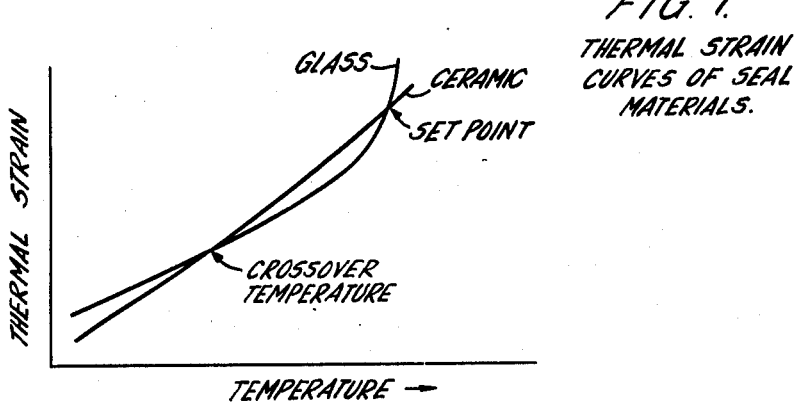
FIGS. 1, 2 and 3 are graphical diagrams referred to above, for explaining real stresses due to differing temperature characteristics of materials.
Figure 2:
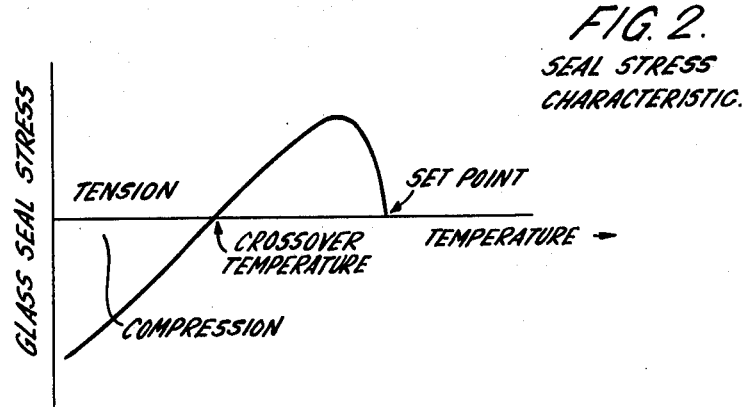
Figure 3:
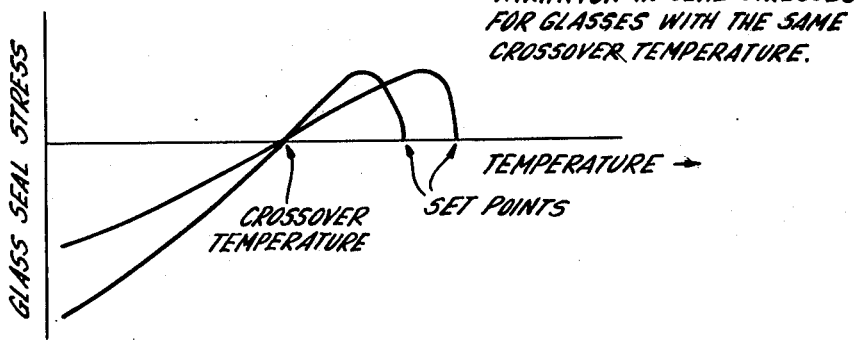
Figure 4:
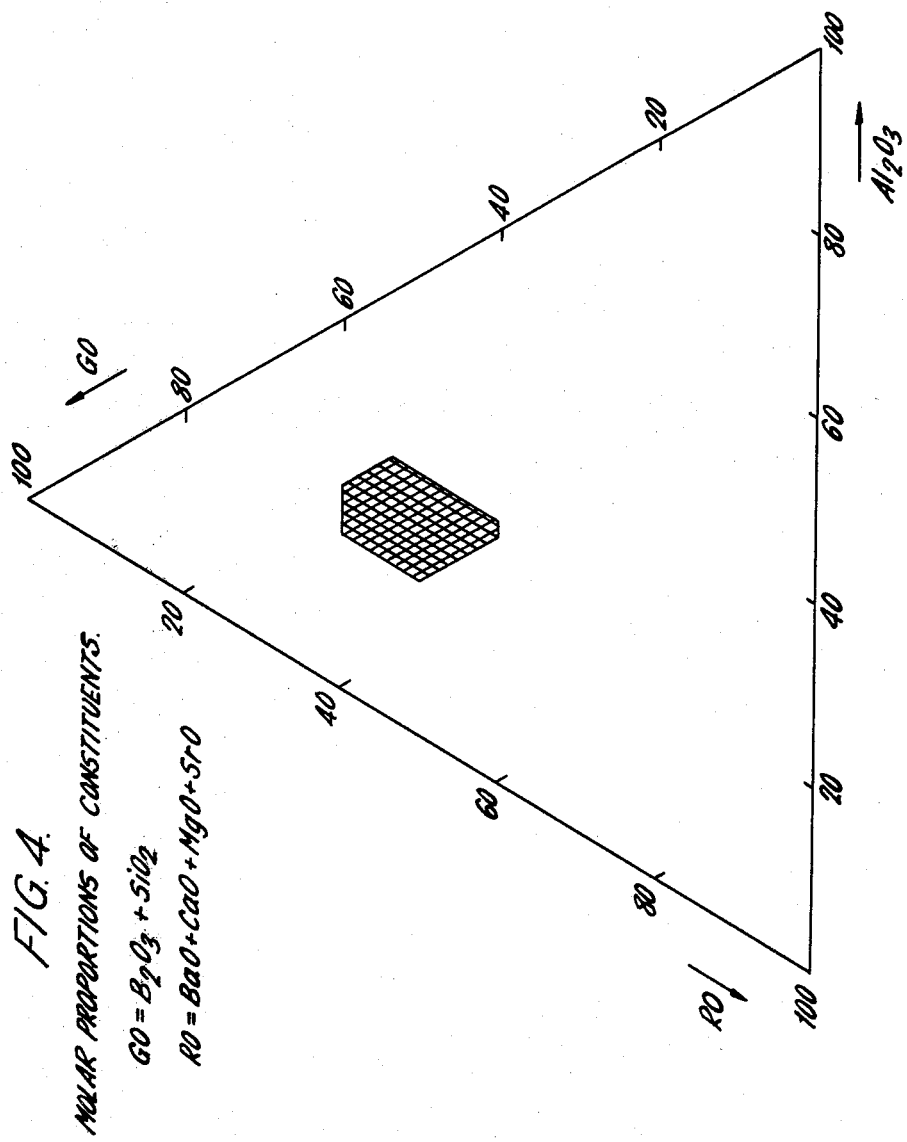
FIG. 4 is a trilinear coordinate composition diagram for glasses showing the molar proportions of glass-forming oxides comprising $B_2O_3$ and $SiO_2$ (marked GO), $Al_2O_3$ and alkaline earth oxides (marked RO)
Figure 5:
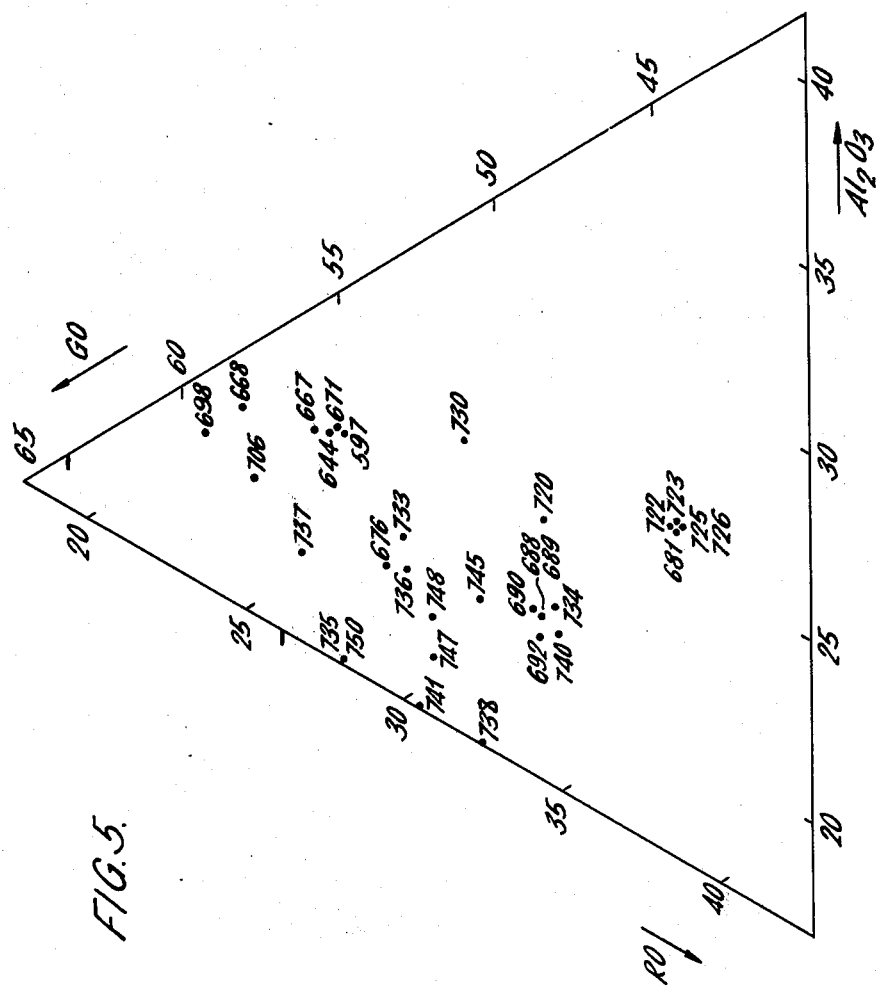
FIG. 5 shows a number of examples plotted on an enlarged part of the diagram of FIG. 4.

FIGS. 4 and 5 are trilinear co-ordinate composition diagrams. The shaded area in FIG. 4 indicates the general range of sealing glass compositions which are within the scope of this invention as set out in claim 1. The further part of the definition in terms of the coefficients $A_1$ to $A_7$ in claim 1 may further restrict the range of compositions according to the mixture of glass forming oxides GO and alkali oxides RO which is used.

The glasses of the present invention include, as explained above, $B_2O_3$ and $SiO_2$ which are referred to as the glass-forming oxides (GO in FIGS. 4 and 5). In the glass compositions of the present invention, the higher the total of boron oxide and silicon oxide, the better are the glass-forming properties. However, the resistance to sodium attack is decreased. Increasing the boron to silicon ratio gives better sodium resistance, better wetting properties and lower firing temperature but decreases the working range and gives a higher densification rate.

Increase of $Al_2O_3$ results in a lower expansion coefficient but reduces the glass-forming properties. It also raises the crossover temperature and glass transition temperature.

The preferred sodium oxide content is as low as possible, within the confines of the impurities of the raw materials used. Enhanced densification results from the inclusion of $Na_2O$. The effect of deliberate addition of sodium oxide is shown in Table 3. Example 32 in that table is a glass having a composition, in molar percentages, of 46.63 $B_2O_3$, 6.75 $SiO_2$, 20.51 $Al_2O_3$, 10.26 BaO, 6.52 CaO, 6.53 MgO and 2.8 $Na_2O$. Example 33 has the composition 46.73 $B_2O_3$, 6.54 $SiO_2$, 20.56 $Al_2O_3$, 7.48 BaO, 6.55 CaO, 6.54 SrO and 5.61 $Na_2O$.

It will be seen that the problems of high expansion, high densification rate and reactivity to molten sodium which occur with BAB glass can be overcome by modifications of the glass compositions in the various ways described.

Table 1 below gives experimental and calculated data for thirtyone different glasses, identified by case numbers in the left-hand column, of which properties have been measured. All of these glasses, except Case 1 (Example 597), which is included for comparison purposes, lie within the scope defined above.

As has been stated above, a number of physical properties of glass compositions may be expressed, like the coefficient of thermal expansion, as a series of coefficients representing the molar effects of the various constituents, which can be summed to obtain the magnitude of the required parameter. Tables 2(a), 2(b), 2(c), 2(d), 2(e) and 2(f) set forth coefficients and compare observed and predicted values for the expansion coefficient, transformation temperature, deformation temperature, room temperature, seal stress, crossover temperature and change in seal stress due to densification respectively for the 31 glasses listed in Table 1. In each of Tables 2(a), 2(b), 2(c), 2(d), 2(e) and 2(f) Case No. 1 is the BAB glass which is outside the scope of the present invention and which is included for comparison purposes only.

It will be understood that, although the shaded area of FIG. 4 shows the composition ranges within which the glasses of the present invention lie, it does not constitute a definition of suitable glasses. The actual composition has to be chosen, as previously described, to obtain the required properties, e.g. expansion coefficient. As previously explained some of the compositions lie close to the boundary of the glass-forming region and care has to be taken, in the use of compositions in the boundary region, because of the possibility of devitrification.

It will be noted from Table 1 that the densification rates of all the glasses listed (except the BAB glass No. 597 which is included for comparison purposes) are below, and most are substantially below that of BAB glass.

Figure 6:
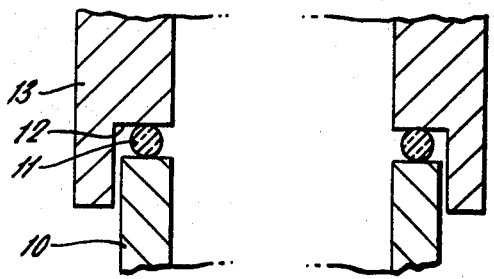
FIGS. 6 and 7 illustrate respectively the forming of two different seals between an alpha-alumina and a beta-alumina component.
Figure 7:
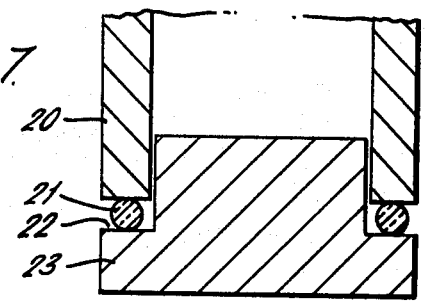

For sealing alpha-alumina to beta-alumina, the above-described glass can be used in known ways, e.g. by the use of a glass powder or a glass preform. A very convenient way of sealing a cylindrical alpha-alumina element to an end of a beta-alumina tube is to introduce a ring of glass between these surfaces, the glass is then being fused to seal the alumina elements together. Such an arrangement is illustrated in FIG. 6 where there is shown the upper end of a beta-alumina electrolyte tube, which forms a separator between molten sodium and molten sulphur/polysulphides in a sodium sulphur cell. The end surface of the electrolyte tube 10 is sealed by glass 11 to a shoulder 12 formed in an alpha-alumina ring 13. FIG. 7 is another example of a seal; in this case the lower end of a beta-alumina electrolyte tube 20 is sealed by glass 21 to a shoulder 22 formed in an alpha-alumina closure plate 23. In each of these examples, the glass is fused and forms a hermetic seal between the beta-alumina and alpha-alumina components.

From Table 1 it will be seen that all the glasses tested have a transformation temperature Tg which is such that the sealing operation can be carried out at a relatively low temperature. The magnitude of the difference between the values of Tg and Td is indicative of the rate of change of viscosity with temperature and hence of the working range of the glass, which lies at a higher temperature between Td and the temperature at which the viscosity is $10^3$ pascal seconds. All the glasses listed in Table 1 have a long working range, making them easy to form. The working range, for example, in every case is adequate for rod drawing.

In Table 2(a), the regression coefficients showing the effect on the expansion coefficient of variations in the amounts of the various components are set forth at the bottom of the table. These enable the expansion coefficient of a glass (within the range of possible compositions) to be calculated from the molar percentage composition. The above-mentioned expression $0.0517A_1 + 0.0354A_2 - 0.0063A_3 + 0.168A_4 + 0.1336A_5 + 0.0098A_6 + 0.1597A_7$ is equal to the expansion coefficient multiplied by $10^6$. It will be seen that the various coefficients in this expression are the regression coefficients of Table 2(a).

Using Table 2(b) in a similar way, the transformation temperature can be calculated from the regression coefficients; the transformation temperature is $5.26A_1 + 6.30A_2 + 7.27A_3 + 4.93A_4 + 6.97A_5 + 7.27A_6 + 5.87A_7$. Similarly from Table 2(c) the calculated deformation temperature is $5.45A_1 + 6.92A_2 + 7.62A_3 + 5.58A_4 + 7.18A_5 + 7.71A_6 + 5.87A_7$.

Table 1 shows the transformation and deformation temperatures calculated in this way and also the observed values.

Table 2(d) shows the room temperature seal stress. Using the regression coefficients of this table, a room temperature seal stress of less than a predetermined value, e.g. 50 N/mm$^2$ can be ensured by using a composition in which $0.38A_1 + 1.47A_2 + 4.25A_3 - 5.41A_4 - 2.98A_5 - 0.78A_6 - 4.30A_7$ is less than the predetermined value, e.g. 50 N/mm$^2$. It will be noted that, in all the examples in Table 1, the room temperature seal stress is compressive.

Table 2(e) shows the cross-over temperature and the regression coefficients whereby this may be calculated. If the cross-over temperature is to exceed a predetermined value, e.g. 240° C., then the composition is chosen so that $1.27A_1 + 9.24A_2 + 31.26A_3 - 28.39A_4 - 15.01A_5 - 2.54A_6 - 23.29A_7$ is in excess of said predetermined value.

Table 2f shows the change in seal stress due to densification at 400° C. for the first 100 hours. This stress change subsequently slows down, but may continue to increase even after a long period. For all the examples in Table 1, the change in seal stress due to densification is either to increase a tensile seal stress or decrease a compressive seal stress at 400° C. Using Table 2(f), the stress change due to densification at 400° C. for the first 100 hours, can be calculated from the regression coefficients; the stress change due to densification is $0.322A_1 + 0.0016A_2 - 0.218A_3 + 0.139A_4 - 0.190A_5 - 0.238A_6 - 0.036A_7$. In applications of this invention, the densification rate should be kept as low as practicable in keeping with the other requirement described in this specification.

Figure 8:
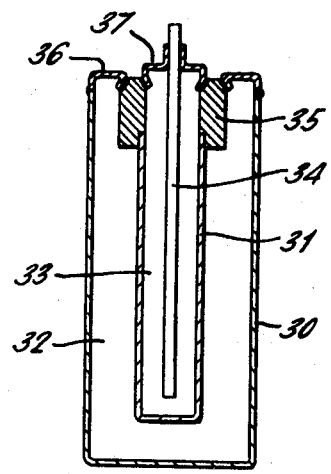
FIG. 8 illustrates diagrammatically a sodium sulphur cell embodying the invention.

FIG. 8 is a diagrammatic representation of a sodium-sulphur cell. In this particular cell, a cylindrical housing 30, typically a metal housing, surrounds a beta-alumina tube 31 which separates a first annular region 32, between the housing 30 and outer surface of the tube 31, from a second annular region 33 between the inner surface of the tube 31 and a co-axial current collector 34. One of these regions is the anodic region and the other is the cathodic region. In this particular example, the cell is of the central sulphur type, and has sulphur/polysulphides forming the cathodic reactant in the region 33 and has sodium in the region 32. The beta-alumina tube 31 is open at the top end and, around this end of the tube, is an alpha-alumina collar 35. A first closure 36 extends between the collar 35 and housing 30 to seal the annular region 32 whilst a second collar 37 extends between the collar 35 and current collector 34 to seal the region 33.

The collar 35 is sealed to the beta-alumina tube 31 by a glass seal using a glass as has been described above. The techniques described above enable a suitable glass to be chosen which will not unduly stress the beta-alumina tube. The same glass may also be used for other seals in the cell, if glass seals are employed. The closure members 36, 37 would usually be metal and may be welded to the housing 30, if the latter is of metal and also welded to the current collector 34 if that is metal. The seal between the closure member and the alpha-alumina collar may use glass or may employ diffusion bonding.

TABLE 1

| Case No. | Glass No. | mol % | | | | | | | Transformation Temp (°C.) Tg | | Deformation Temp (°C.) Td | |
|---|---|---|---|---|---|---|---|---|---|---|---|---|
| | | $B_2O_3$ | $SiO_2$ | $Al_2O_3$ | BaO | CaO | MgO | SrO | Obs | Calc | Obs | Calc |
| 1 | 597 | 54.83 | 0 | 23.38 | 21.78 | 0 | 0 | 0 | 571 | 566 | 606 | 598 |
| 2 | 644 | 47.46 | 7.85 | 23.13 | 21.55 | 0 | 0 | 0 | 576 | 572 | 611 | 608 |
| 3 | 667 | 40.26 | 15.54 | 22.89 | 21.32 | 0 | 0 | 0 | 578 | 581 | 613 | 620 |
| 4 | 668 | 42.82 | 15.26 | 22.48 | 19.44 | 0 | 0 | 0 | 577 | 581 | 613 | 619 |
| 5 | 671 | 47.71 | 7.37 | 23.27 | 15.48 | 6.17 | 0 | 0 | 588 | 586 | 618 | 619 |
| 6 | 676 | 46.52 | 6.96 | 20.46 | 13.03 | 6.51 | 6.51 | 0 | 591 | 594 | 626 | 627 |
| 7 | 681 | 37.12 | 7.20 | 25.97 | 14.85 | 7.42 | 7.42 | 0 | 612 | 608 | 649 | 643 |
| 8 | 688 | 42.08 | 6.48 | 21.50 | 7.48 | 14.96 | 7.49 | 0 | 610 | 614 | 642 | 645 |
| 9 | 689 | 42.13 | 6.39 | 21.52 | 7.48 | 7.48 | 14.98 | 0 | 622 | 616 | 653 | 649 |

TABLE 1-continued

| | | | | | | | | | | | |
|---|---|---|---|---|---|---|---|---|---|---|---|
| 10 | 690 | 41.94 | 6.80 | 21.43 | 12.11 | 5.59 | 12.13 | 0 | 604 | 605 | 639 | 640 |
| 11 | 692 | 42.10 | 6.48 | 21.51 | 0 | 7.48 | 7.48 | 14.97 | 607 | 613 | 632 | 637 |
| 12 | 698 | 45.0 | 14.25 | 21.23 | 13.52 | 6.01 | 0 | 0 | 588 | 589 | 624 | 624 |
| 13 | 706 | 44.0 | 13.74 | 20.70 | 10.79 | 10.78 | 0 | 0 | 591 | 547 | 628 | 630 |
| 14 | 720 | 34.4 | 14.09 | 24.06 | 13.76 | 6.82 | 6.87 | 0 | 613 | 610 | 647 | 647 |
| 15 | 722 | 37.08 | 7.32 | 25.93 | 16.69 | 3.71 | 9.26 | 0 | 593 | 605 | 630 | 641 |
| 16 | 723 | 37.34 | 6.98 | 26.12 | 11.20 | 14.63 | 3.72 | 0 | 615 | 614 | 650 | 647 |
| 17 | 725 | 37.22 | 6.95 | 26.04 | 9.30 | 13.03 | 3.73 | 3.72 | 607 | 615 | 637 | 645 |
| 18 | 726 | 37.23 | 6.95 | 26.04 | 7.44 | 11.17 | 3.73 | 7.44 | 623 | 614 | 645 | 643 |
| 19 | 730 | 41.10 | 10.0 | 25.0 | 10.76 | 2.39 | 2.39 | 8.37 | 601 | 597 | 635 | 628 |
| 20 | 733 | 42.9 | 10.0 | 21.3 | 7.73 | 3.87 | 7.73 | 6.45 | 600 | 602 | 630 | 639 |
| 21 | 734 | 28.1 | 20.0 | 21.9 | 9.0 | 4.5 | 9.0 | 7.5 | 624 | 618 | 664 | 654 |
| 22 | 735 | 44.9 | 10.0 | 17.0 | 4.22 | 5.61 | 14.05 | 4.22 | 609 | 609 | 642 | 640 |
| 23 | 736 | 42.8 | 10.0 | 20.7 | 10.6 | 1.33 | 10.6 | 3.98 | 598 | 600 | 633 | 634 |
| 24 | 737 | 46.2 | 10.0 | 19.4 | 0 | 24.4 | 0 | 0 | 621 | 617 | 650 | 644 |
| 25 | 738 | 30.4 | 20.0 | 16.9 | 4.91 | 6.54 | 16.35 | 4.91 | 623 | 626 | 657 | 662 |
| 26 | 740 | 28.0 | 20.0 | 21.2 | 12.32 | 1.54 | 12.32 | 4.62 | 619 | 616 | 662 | 654 |
| 27 | 741 | 32.0 | 20.0 | 19.7 | 0 | 28.3 | 0 | 0 | 634 | 635 | 664 | 666 |
| 28 | 743 | 37.65 | 15 | 17.00 | 4.57 | 6.08 | 15.20 | 4.57 | 618 | 619 | 646 | 651 |
| 29 | 745 | 35.4 | 15 | 20.95 | 11.46 | 1.44 | 11.46 | 4.30 | 609 | 608 | 647 | 644 |
| 30 | 747 | 32.0 | 20 | 18.7 | 0 | 29.3 | 0 | 0 | 637 | 634 | 668 | 665 |
| 31 | 750 | 44.90 | 10 | 17.00 | 10.96 | 0 | 17.36 | 0 | 608 | 603 | 642 | 638 |

| Case No. | Expansion Coefficient $(25^{500}) \times 10^{-6}$ | | Room Temp Seal Stress N/mm² | | Crossover Temperature °C. | | Densification Rate N/mm²/100 Hrs @ 400° C. | |
|---|---|---|---|---|---|---|---|---|
| | Obs | Calc | Obs | Calc | Obs | Calc | Obs | Calc |
| 1 | 6.5 | 6.36 | 4.2 | 2.3 | 132 | 182 | 15.8 | 15.6 |
| 2 | 6.1 | 6.21 | 12.9 | 11.1 | 263 | 243 | — | 13.2 |
| 3 | 6.01 | 6.08 | 21.9 | 20.0 | 345 | 304 | 10.0 | 10.9 |
| 4 | 5.91 | 5.89 | 27.1 | 29.0 | 343 | 345 | 12.6 | 11.6 |
| 5 | 5.83 | 6.02 | 22.8 | 25.7 | 323 | 323 | — | 11.3 |
| 6 | 6.26 | 6.23 | 19.4 | 19.9 | 298 | 278 | 9.6 | 9.6 |
| 7 | 6.23 | 6.24 | 25.0 | 26.8 | 384 | 373 | 3.8 | 5.2 |
| 8 | 6.28 | 6.27 | 23.0 | 26.0 | 320 | 324 | 5.7 | 5.3 |
| 9 | 6.04 | 6.01 | 39.8 | 42.4 | 387 | 422 | 4.4 | 4.9 |
| 10 | 6.25 | 6.26 | 21.5 | 25.4 | 307 | 327 | 6.9 | 6.6 |
| 11 | 6.40 | 6.40 | 20.0 | 24.4 | 305 | 305 | 5.1 | 5.2 |
| 12 | 5.89 | 5.78 | 28.8 | 37.2 | 350 | 378 | — | 10.6 |
| 13 | 5.93 | 5.89 | 32.6 | 34.4 | 365 | 361 | 8.8 | 9.1 |
| 14 | 6.04 | 6.04 | 36.5 | 35.9 | 412 | 415 | 5.2 | 4.8 |
| 15 | 6.27 | 6.24 | 27.9 | 26.5 | 386 | 372 | 6.6 | 5.7 |
| 16 | 6.25 | 6.22 | 28.7 | 28.3 | 388 | 380 | 4.4 | 4.2 |
| 17 | 6.22 | 6.28 | 27.6 | 26.9 | 385 | 369 | 4.3 | 4.1 |
| 18 | 6.29 | 6.31 | 26.5 | 26.5 | 380 | 365 | 4.1 | 4.1 |
| 19 | 6.11 | 6.03 | 35.4 | 33.3 | 390 | 383 | — | 8.0 |
| 20 | 6.16 | 6.05 | 34.4 | 34.3 | 360 | 364 | — | 7.5 |
| 21 | 6.11 | 6.23 | 31.2 | 31.7 | — | 384 | — | 2.3 |
| 22 | 6.03 | 6.09 | 35.0 | 35.3 | 370 | 342 | 9.0 | 6.8 |
| 23 | 6.01 | 6.08 | 43.8 | 32.2 | 360 | 353 | — | 7.8 |
| 24 | 5.79 | 5.88 | 49.9 | 42.0 | 394 | 391 | — | 6.0 |
| 25 | 6.24 | 6.27 | 31.0 | 32.9 | 374 | 358 | — | 1.5 |
| 26 | 6.29 | 6.26 | 32.4 | 29.4 | — | 371 | — | 2.7 |
| 27 | 6.00 | 6.02 | 42.5 | 41.0 | 430 | 416 | — | 0.7 |
| 28 | 6.17 | 6.18 | 34.39 | 34.3 | — | 351 | — | 4.1 |
| 29 | 6.31 | 6.17 | 30.83 | 30.8 | — | 362 | — | 5.3 |
| 30 | 6.29 | 6.16 | 32.38 | 33.8 | — | 369 | — | 0.7 |
| 31 | 6.13 | 6.13 | 31.89 | 31.2 | — | 325 | — | 8.2 |

Note:-
Room Temperature Seal Stress is compressive and densification stress change is tensile.

TABLE 2(a)

| CASE NO. | EXPN. COEFF $(\times 10^{-6})$ OBSERVED VALUE | EXPN. COEFF $(\times 10^{-6})$ PREDICTED VALUE | RESIDUAL | % DEVIATION |
|---|---|---|---|---|
| 1 | 6.5000 | 6.3636 | 0.13638 | 2.14 |
| 2 | 6.1000 | 6.2075 | −0.10754 | −1.73 |
| 3 | 6.0100 | 6.0851 | −0.75077E-01 | −1.23 |
| 4 | 5.9100 | 5.8938 | 0.16214E-01 | 0.28 |
| 5 | 5.8300 | 6.0195 | −0.18946 | −3.15 |
| 6 | 6.2600 | 6.2346 | 0.25382E-01 | 0.41 |
| 7 | 6.2300 | 6.2404 | −0.10369E-01 | 0.17 |
| 8 | 6.2800 | 6.2714 | 0.85928E-02 | 0.14 |
| 9 | 6.0400 | 6.0115 | 0.28462E-01 | 0.47 |
| 10 | 6.2500 | 6.2612 | −0.11203E-01 | −0.18 |
| 11 | 6.4000 | 6.4004 | −0.38403E-03 | −0.01 |
| 12 | 5.8900 | 5.7838 | 0.10623 | 1.84 |
| 13 | 5.9300 | 5.8945 | 0.35542E-01 | 0.60 |
| 14 | 6.0400 | 6.0368 | 0.32265E-02 | 0.05 |
| 15 | 6.2700 | 6.2375 | 0.32455E-01 | 0.52 |
| 16 | 6.2500 | 6.2224 | 0.27599E-01 | 0.44 |
| 17 | 6.2200 | 6.2813 | −0.61272E-01 | −0.98 |
| 18 | 6.2900 | 6.3119 | −0.21869E-01 | −0.35 |
| 19 | 6.1100 | 6.0299 | 0.80135E-01 | 1.33 |
| 20 | 6.1600 | 6.0558 | 0.10424 | 1.72 |
| 21 | 6.1100 | 6.2286 | −0.11859 | −1.90 |
| 22 | 6.0300 | 6.0927 | −0.62698E-01 | −1.03 |
| 23 | 6.0100 | 6.0846 | −0.74605E-01 | −1.23 |
| 24 | 5.7900 | 5.8849 | −0.94874E-01 | −1.61 |
| 25 | 6.2400 | 6.2732 | −0.33152E-01 | −0.53 |
| 26 | 6.2900 | 6.2594 | 0.30637E-01 | 0.49 |
| 27 | 6.0000 | 6.0234 | −0.23440E-01 | −0.39 |

TABLE 2(a)-continued

| | | | |
|---|---|---|---|
| 28 | 6.1700 | 6.1842 | −0.14247E-01 −0.23 |
| 29 | 6.3100 | 6.1727 | 0.13735 2.23 |
| 30 | 6.2900 | 6.1635 | 0.12650 2.05 |
| 31 | 6.1300 | 6.1304 | −0.43482E-03 −0.01 |

STANDARD ERROR OF THE ESTIMATE = 8.65618E-02

| INDEPENDENT VARIABLE | | REGRESSION COEFFICIENT | |
|---|---|---|---|
| A | $B_2O_3$ | A1 | 0.51788E-01 |
| B | $SiO_2$ | A2 | 0.354561E-01 |
| C | $Al_2O_3$ | A3 | −0.638905E-02 |
| D | BaO | A4 | 0.168660 |
| E | CaO | A5 | 0.133673 |
| F | MgO | A6 | 0.985400E-01 |
| G | SrO | A7 | 0.159706 |

TABLE 2(b)

| CASE NO. | TRANSFORMATION TEMPERATURE (°C.) OBSERVED VALUE | TRANSFORMATION TEMPERATURE (°C.) PREDICTED VALUE | RESIDUAL | % DEVIATION |
|---|---|---|---|---|
| 1 | 571 | 565.60 | 5.2966 | 0.95 |
| 2 | 576 | 571.82 | 4.1788 | 0.73 |
| 3 | 578 | 581.10 | −3.0983 | 0.53 |
| 4 | 577 | 580.60 | −3.5953 | −0.62 |
| 5 | 588 | 585.88 | 2.1192 | 0.36 |
| 6 | 591 | 594.14 | −3.1412 | −0.53 |
| 7 | 612 | 608.31 | 3.6946 | 0.61 |
| 8 | 610 | 614.10 | −4.0987 | −0.67 |
| 9 | 622 | 616.25 | 5.7536 | 0.93 |
| 10 | 604 | 605.99 | −1.9914 | −0.33 |
| 11 | 607 | 612.90 | −5.8974 | −0.96 |
| 12 | 588 | 589.34 | −1.3359 | −0.23 |
| 13 | 591 | 596.82 | −5.8225 | −0.98 |
| 14 | 612 | 609.93 | 2.0700 | 0.34 |
| 15 | 593 | 605.05 | −12.051 | −1.99 |
| 16 | 615 | 613.94 | 1.0624 | 0.17 |
| 17 | 607 | 614.52 | −7.5178 | −1.22 |
| 18 | 623 | 614.20 | 8.8027 | 1.43 |
| 19 | 601 | 597.05 | 3.9463 | 0.66 |
| 20 | 600 | 602.66 | −2.6614 | −0.44 |
| 21 | 624 | 618.18 | 5.8161 | 0.94 |
| 22 | 609 | 609.53 | −0.53344 | −0.09 |
| 23 | 598 | 600.45 | −2.4490 | −0.41 |
| 24 | 621 | 617.17 | 3.8344 | 0.62 |
| 25 | 623 | 626.20 | −3.2015 | −0.51 |
| 26 | 619 | 615.52 | 3.4798 | 0.57 |
| 27 | 634 | 634.94 | −0.94428 | −0.15 |
| 28 | 618 | 618.29 | −0.28501 | −0.05 |
| 29 | 609 | 608.02 | 0.98053 | 0.16 |
| 30 | 637 | 634.65 | 2.3521 | 0.37 |
| 31 | 608 | 602.86 | 5.1412 | 0.85 |

STANDARD ERROR OF THE ESTIMATE = 5.1633

| INDEPENDENT VARIABLE | | REGRESSION COEFFICIENT | |
|---|---|---|---|
| A | $B_2O_3$ | A1 | 5.25703 |
| B | $SiO_2$ | A2 | 6.30455 |
| C | $Al_2O_3$ | A3 | 7.27117 |
| D | BaO | A4 | 4.92931 |
| E | CaO | A5 | 6.97477 |
| F | MgO | A6 | 7.26598 |
| G | SrO | A7 | 5.86500 |

TABLE 2(c)

| CASE NO. | DEFORMATION TEMPERATURE (°C.) OBSERVED VALUE | DEFORMATION TEMPERATURE (°C.) PREDICTED VALUE | RESIDUAL | % DEVIATION |
|---|---|---|---|---|
| 1 | 606 | 598.54 | 7.4556 | 1.25 |
| 2 | 611 | 607.83 | 3.1727 | 0.52 |
| 3 | 613 | 620.22 | −7.2244 | −1.16 |
| 4 | 613 | 618.70 | −5.6986 | −0.92 |
| 5 | 618 | 619.11 | −1.1145 | −0.18 |
| 6 | 626 | 627.29 | −1.2857 | −0.20 |
| 7 | 649 | 643.43 | 5.5745 | 0.87 |
| 8 | 642 | 645.04 | −3.0447 | −0.47 |
| 9 | 653 | 648.92 | 4.0775 | 0.63 |
| 10 | 639 | 640.18 | −1.1778 | −0.18 |
| 11 | 632 | 637.45 | −5.4513 | −0.86 |
| 12 | 624 | 624.24 | −0.24004 | −0.04 |
| 13 | 628 | 630.26 | −2.2612 | −0.36 |
| 14 | 647 | 647.00 | 0.17929E-02 | 0.00 |
| 15 | 630 | 641.45 | −11.452 | −1.79 |
| 16 | 650 | 646.46 | 3.5426 | 0.55 |
| 17 | 637 | 645.47 | −8.4734 | −1.31 |
| 18 | 645 | 643.56 | 1.4403 | 0.22 |
| 19 | 635 | 628.41 | 6.5866 | 1.05 |
| 20 | 630 | 633.82 | −3.8239 | −0.60 |
| 21 | 664 | 654.27 | 9.7274 | 1.49 |
| 22 | 642 | 640.49 | 1.5106 | 0.24 |
| 23 | 633 | 633.97 | −0.97308 | −0.15 |
| 24 | 650 | 644.15 | 5.8468 | 0.91 |
| 25 | 657 | 662.05 | −5.0536 | −0.76 |
| 26 | 662 | 654.35 | 7.6502 | 1.17 |
| 27 | 664 | 666.18 | −2.1789 | −0.33 |
| 28 | 646 | 651.71 | −5.7095 | −0.88 |
| 29 | 647 | 644.20 | 2.8026 | 0.44 |
| 30 | 668 | 665.74 | 2.2552 | 0.34 |
| 31 | 642 | 638.47 | 3.5295 | 0.55 |

STANDARD ERROR OF THE ESTIMATE = 5.7767

| INDEPENDENT VARIABLE | | REGRESSION COEFFICIENT | |
|---|---|---|---|
| A | $B_2O_3$ | A1 | 5.45372 |
| B | $SiO_2$ | A2 | 6.91713 |
| C | $Al_2O_3$ | A3 | 7.61673 |
| D | BaO | A4 | 5.57566 |
| E | CaO | A5 | 7.18260 |
| F | MgO | A6 | 7.70930 |
| G | SrO | S7 | 5.86502 |

TABLE 2(d)

| CASE NO. | ROOM TEMP SEAL STRESS (N/mm²) OBSERVED VALUE | ROOM TEMP SEAL STRESS (N/mm²) PREDICTED VALUE | RESIDUAL | % DEVIATION |
|---|---|---|---|---|
| 1 | 4.2000 | 2.3084 | 1.8916 | 81.94 |
| 2 | 12.900 | 11.107 | 1.7931 | 16.14 |
| 3 | 21.900 | 20.002 | 1.8976 | 9.49 |
| 4 | 27.100 | 29.006 | −1.9059 | −6.57 |
| 5 | 22.800 | 25.714 | −2.9142 | −11.33 |
| 6 | 19.400 | 19.910 | −0.50976 | −2.56 |
| 7 | 25.000 | 26.810 | −1.8097 | −6.75 |
| 8 | 23.000 | 26.077 | −3.0767 | −11.80 |
| 9 | 39.800 | 42.406 | −2.6055 | −6.14 |
| 10 | 21.500 | 25.409 | −3.9095 | −15.39 |
| 11 | 20.000 | 24.402 | −4.4017 | −18.04 |
| 12 | 28.800 | 37.201 | −8.4008 | −22.58 |
| 13 | 32.600 | 34.399 | −1.7993 | −5.23 |
| 14 | 36.500 | 35.908 | 0.59161 | 1.65 |
| 15 | 27.900 | 26.464 | 1.4359 | 5.43 |
| 16 | 28.700 | 28.250 | 0.44985 | 1.59 |
| 17 | 27.600 | 26.917 | 0.68296 | 2.54 |
| 18 | 26.500 | 26.558 | −0.58458E-01 | −0.22 |
| 19 | 35.400 | 33.294 | 2.1056 | 6.32 |
| 20 | 34.400 | 34.328 | 0.72313E-01 | 0.21 |
| 21 | 31.200 | 31.739 | −0.53902 | −1.70 |
| 22 | 35.010 | 35.382 | −0.37236 | −1.05 |
| 23 | 43.800 | 32.239 | 11.561 | 35.86 |
| 24 | 49.970 | 42.088 | 7.8817 | 18.73 |
| 25 | 31.050 | 32.901 | −1.8511 | −5.63 |
| 26 | 32.400 | 29.395 | 3.0050 | 10.22 |
| 27 | 42.500 | 41.041 | 1.4590 | 3.55 |
| 28 | 34.390 | 34.306 | 0.84491E-01 | 0.25 |
| 29 | 30.830 | 30.802 | 0.27737E-01 | 0.09 |
| 30 | 32.380 | 33.817 | −1.4370 | −4.25 |
| 31 | 31.890 | 31.233 | 0.65735 | 2.10 |

TABLE 2(d)-continued

STANDARD ERROR OF THE ESTIMATE = 3.9348

| INDEPENDENT VARIABLE | | REGRESSION COEFFICIENT | |
|---|---|---|---|
| A | $B_2O_3$ | A1 | 0.381181 |
| B | $SiO_3$ | A2 | 1.46994 |
| C | $Al_2O_3$ | A3 | 4.24762 |
| D | BaO | A4 | −5.41328 |
| E | CaO | A5 | −2.97645 |
| F | MgO | A6 | −0.775451 |
| G | SrO | A7 | −4.30683 |

TABLE 2(e)

| CASE NO. | CROSSOVER TEMPERATURE (°C.) OBSERVED VALUE | CROSSOVER TEMPERATURE (°C.) PREDICTED VALUE | RESIDUAL | % DEVIATION |
|---|---|---|---|---|
| 1 | 132 | 181.94 | −49.942 | −27.45 |
| 2 | 263 | 243.43 | 19.566 | 8.04 |
| 3 | 345 | 304.73 | 40.273 | 13.22 |
| 4 | 343 | 345.97 | −2.9699 | −0.86 |
| 5 | 323 | 323.89 | −0.88649 | −0.27 |
| 6 | 298 | 278.62 | 19.379 | 6.96 |
| 7 | 384 | 373.45 | 10.553 | 2.83 |
| 8 | 320 | 329.39 | −9.3863 | −2.85 |
| 9 | 387 | 422.03 | −35.026 | −8.30 |
| 10 | 307 | 327.33 | −20.330 | −6.21 |
| 11 | 305 | 305.65 | −0.64716 | −0.21 |
| 12 | 350 | 378.20 | −28.201 | −7.46 |
| 13 | 365 | 361.56 | 3.4433 | 0.95 |
| 14 | 412 | 415.32 | −3.3204 | −0.80 |
| 15 | 386 | 372.07 | 13.931 | 3.74 |
| 16 | 388 | 380.35 | 7.6496 | 2.01 |
| 17 | 385 | 369.26 | 15.738 | 4.26 |
| 18 | 380 | 363.65 | 16.354 | 4.50 |
| 19 | 390 | 383.51 | 6.4855 | 1.69 |
| 20 | 360 | 364.84 | −4.8424 | −1.33 |
| 21 | 350 | 384.29 | −34.290 | −8.92 |
| 22 | 370 | 342.60 | 27.399 | 8.00 |
| 23 | 360 | 353.17 | 6.8289 | 1.93 |
| 24 | 394 | 391.06 | 2.9408 | 0.75 |
| 25 | 374 | 358.13 | 15.870 | 4.43 |
| 26 | 350 | 371.12 | −21.122 | −5.69 |
| 27 | 430 | 416.23 | 13.772 | 3.31 |
| 28 | 350 | 351.67 | −1.6700 | −0.47 |
| 29 | 350 | 362.07 | −12.071 | −3.33 |
| 30 | 350 | 369.96 | −19.959 | −5.39 |
| 31 | 350 | 325.50 | 24.496 | 7.53 |

STANDARD ERROR OF THE ESTIMATE = 22.723

| INDEPENDENT VARIABLE | | REGRESSION COEFFICIENT | |
|---|---|---|---|
| A | $B_2O_3$ | A1 | 1.26972 |
| B | $SiO_2$ | A2 | 9.23752 |
| C | $Al_2O_3$ | A3 | 31.2554 |
| D | BaO | A4 | −28.3943 |
| E | CaO | A5 | −15.0136 |
| F | MgO | A6 | −2.53581 |
| G | SrO | A7 | −23.2933 |

TABLE 2(f)

Densification Rates
($N/mm^2$ at 400° C. in first 100 hours)

| Case No. | Observed Value | Predicted Value |
|---|---|---|
| 1 | 15.8 | 15.59 |
| 2 | — | 13.15 |
| 3 | 10 | 10.96 |
| 4 | 12.6 | 11.61 |
| 5 | — | 11.28 |
| 6 | 9.6 | 9.56 |
| 7 | 3.8 | 5.19 |
| 8 | 5.7 | 5.29 |
| 9 | 4.4 | 4.94 |
| 10 | 6.9 | 6.58 |
| 11 | 5.1 | 5.14 |
| 12 | — | 10.62 |
| 13 | 8.8 | 9.13 |
| 14 | 5.2 | 4.84 |
| 15 | 6.6 | 5.71 |
| 16 | 4.4 | 4.23 |
| 17 | 4.3 | 4.11 |
| 18 | 4.1 | 4.08 |
| 19 | — | 7.97 |
| 20 | — | 7.45 |
| 21 | — | 2.29 |
| 22 | 9.0 | 6.79 |
| 23 | — | 7.84 |
| 24 | — | 6.03 |
| 25 | — | 1.52 |
| 26 | — | 2.75 |
| 27 | — | 0.66 |
| 28 | — | 4.14 |
| 29 | — | 5.29 |
| 30 | — | 0.69 |
| 31 | — | 8.16 |

| Independent Variable | | Regression Coefficient | |
|---|---|---|---|
| A | $B_2O_3$ | A1 | 0.322 |
| B | $SiO_2$ | A2 | 0.0016 |
| C | $Al_2O_3$ | A3 | −0.218 |
| D | BaO | A4 | 0.139 |
| E | CaO | A5 | −0.190 |
| F | MgO | A6 | −0.238 |
| G | SrO | A7 | −0.036 |

TABLE 3

| Case No. | Glass No | Transformation Temp (°C.) Tg Obs | Transformation Temp (°C.) Tg Calc | Deformation Temp (°C.) Td Obs | Deformation Temp (°C.) Td Calc | Expansion Coefficient $(25^{500}) \times 10^{-6}$ Obs | Expansion Coefficient $(25^{500}) \times 10^{-6}$ Calc | Room Temp Seal Stress $N/mm^2$ Obs | Room Temp Seal Stress $N/mm^2$ Calc | Crossover Temperature °C. Obs | Crossover Temperature °C. Calc | Densification Rate $N/mm^2$/100 hrs @ 400° C. Obs | Densification Rate $N/mm^2$/100 hrs @ 400° C. Calc |
|---|---|---|---|---|---|---|---|---|---|---|---|---|---|
| 32 | 693 | 566 | 564 | 603 | 599 | 6.32 | 6.60 | 5.6 | 2.0 | 146 | 166 | 14.5 | 14.5 |
| 33 | 694 | 547 | 537 | 580 | 574 | 6.67 | 5.93 | −16.9 | −14.9 | None | None | 20.9 | 20 |

The negative values of the room temperature seal stress indicate tension instead of compression

We claim:

1. A glass for sealing to beta-alumina in an electrochemical cell or other energy conversion device containing sodium, said glass consisting essentially of:
   (a) 40–60 mol % glass former consisting of 28–48 mol % $B_2O_3$ and 0–20 mol % $SiO_2$
   (b) 16–28 mol % $Al_2O_3$
   (c) 18–33 mol % of at least one alkaline earth oxide selected from the group consisting of BaO, CaO, MgO and SrO, where the proportions of the constituents furthermore are such that:

$$0.0517 A_1 + 0.0354 A_2 - 0.0063 A_3 + 0.168 A_4 + 0.1336 A_5 + 0.098 A_6 + 0.1597 A_7$$

lies between 5.7 and 6.4, where $A_1$, $A_2$, $A_3$, $A_4$, $A_5$, $A_6$ and $A_7$ are the respective molar percentages of $B_2O_3$, $SiO_2$, $Al_2O_3$, BaO, CaO, MgO and SrO.

2. A glass as claimed in claim 1 wherein the composition includes at least two alkaline earth oxides.

3. A glass as claimed in claim 1 wherein the proportion of $Al_2O_3$ is 17–28 mol %.

4. A glass as claimed in claim 1 wherein the proportions of the alkaline earth oxides lie in the ranges 0–25 mol % BaO, 0–15 mol % SrO, 0–30 mol % CaO and 0–20 mol % MgO with a minimum total of 18 and a maximum total of 33 mol %.

5. A hermetic seal between a beta-alumina component and another component in an electrochemical cell or other energy conversion device containing sodium, said seal comprising a glass as claimed in claim 1 fused between surfaces of said components.

6. A hermetic seal between an alpha-alumina component and a beta-alumina component in a sodium sulphur cell comprising a glass body fused between surfaces of these components, the glass consisting essentially of 28–48 mol % $B_2O_3$, 0–20 mol % $SiO_2$, 16–28 mol % $Al_2O_3$, together with 18–33 mol % of at least one alkaline earth oxide selected from the group consisting of BaO, SrO, CaO and MgO, the proportions of the constituents being such that the combined total of $B_2O_3$ and $SiO_2$ is 40 to 60 mol % and furthermore being such that $0.0517 A_1 + 0.0354 A_2 - 0.0063 A_3 + 0.168 A_4 + 0.1336 A_5 + 0.098 A_6 + 0.1597 A_7$, lies between 5.7 and 6.4 where $A_1$, $A_2$, $A_3$, $A_4$, $A_5$, $A_6$ and $A_7$ are the respective molar percentages of $B_2O_3$, $SiO_2$, $Al_2O_3$, BaO, CaO, MgO and SrO.

7. A hermetic seal as claimed in claim 6 wherein the composition comprises at least two alkaline earth oxides.

8. A hermetic seal as claimed in either claim 6 or claim 7 wherein the proportions of the alkaline earth oxides lie in the ranges 0–25 mol % BaO, 0–15 mol % SrO, 0–30 mol % CaO and 0–20 mol % MgO with a minimum total of 18 and a maximum total of 33 mol %.

9. A hermetic seal as claimed in claim 6 wherein the proportion of $Al_2O_3$ in the glass lies in the range 17–28 mol %.

10. In a sodium-sulphur cell having a housing containing a beta-alumina tube forming a separator between a cathodic region containing a cathodic reactant comprising sulphur and sodium polysulphides and an anodic region comprising sodium; a support for a closure for at least one of said regions, said support comprising an alpha-alumina collar around or on the end of the beta-alumina tube, said collar being secured to said tube by a hermetic seal formed of glass consisting essentially of
(a) 40–60 mol % glass former consisting of 28–48 mol % $B_2O_3$ and 0–20 mol % $SiO_2$
(b) 16–28 mol % $Al_2O_3$
(c) 18–33 mol % in total of at least one alkaline earth oxide selected from the group consisting of BaO, CaO, MgO and SrO,
where the proportions of the constituents furthermore are such that $0.0517 A_1 + 0.0354 A_2 - 0.0063 A_3 + 0.168 A_4 - 0.1336 A_5 + 0.098 A_6 + 0.1597 A_7$ lies between 5.7 and 6.4 where $A_1$, $A_2$, $A_3$, $A_4$, $A_5$, $A_6$ and $A_7$ are the respective molar percentages of $B_2O_3$, $SiO_2$, $Al_2O_3$, BaO, CaO, MgO and SrO.

11. A sodium-sulphur cell as claimed in claim 10 wherein the glass composition comprising at least two alkaline earth oxides.

12. A sodium-sulphur cell as claimed in claim 10 wherein the proportions of the constituents furthermore are such that $0.38 A_1 + 1.47 A_2 + 4.25 A_3 - 5.41 A_4 - 2.98 A_5 - 0.67 A_6 - 4.30 A_7$ is less than 50.

13. A sodium-sulphur cell as claimed in claim 10 wherein the proportions of the constituents furthermore are such that $1.27 A_1 + 9.24 A_2 + 31.26 A_3 - 28.39 A_4 - 15.01 A_5 - 2.54 A_6 - 23.29 A_7$ is in excess of 240.

14. A sodium-sulphur cell as claimed in claim 10 wherein the proportion of $Al_2O_3$ in the glass lies in the range 17–28 mol %.

15. A glass for sealing beta-alumina in an electrochemical cell or other energy conversion device, said glass comprising, in mol percentage, about 42.82% $B_2O_3$, 15.26% $SiO_2$, 22.48% $Al_2O_3$ and 19.44% BaO.

16. A glass for sealing beta-alumina in an electrochemical cell or other energy conversion device, said glass comprising, in mol percentage, about 44.9% $B_2O_3$, 10.0% $SiO_2$, 17.0% $Al_2O_3$, 4.22% BaO, 5.61% CaO, 14.05% MgO and 4.22% SrO.

17. A glass for sealing beta-alumina in an electrochemical cell or other energy conversion device, said glass comprising, in mol percentage, about 32.0% $B_2O_3$, 20.0% $SiO_2$, 19.7% $Al_2O_3$ and 28.3% CaO.

18. An electro-chemical cell containing sodium and having a beta-alumina element sealed to another element by glass fused between the elements, said glass comprising, in mol percentage, about 42.82% $B_2O_3$, 15.26% $SiO_2$, 22.48% $Al_2O_3$ and 19.44% BaO.

19. An electro-chemical cell containing sodium and having a beta-alumina element sealed to another element by glass fused between the elements, said glass comprising, in mol percentage, about 44.9% $B_2O_3$, 10.0% $SiO_2$, 17.0% $Al_2O_3$, 4.22% BaO, 5.61% CaO, 14.05% MgO and 4.22% SrO.

20. An electro-chemical cell containing sodium and having a beta-alumina element sealed to another element by glass fused between the elements, said glass comprising, in mol percentage, about 32.0% $B_2O_3$, 20.0% $SiO_2$, 19.7% $Al_2O_3$ and 28.3% CaO.

* * * * *